(12) United States Patent
Preston et al.

(10) Patent No.: US 6,663,963 B2
(45) Date of Patent: Dec. 16, 2003

(54) VERY HIGH STRUCTURE, HIGHLY ABSORPTIVE HYBRID SILICA AND METHODS FOR MAKING SAME

(75) Inventors: Barry W. Preston, Whiteford, MD (US); William C. Fultz, Rising Sun, MD (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 10/369,610

(22) Filed: Feb. 21, 2003

(65) Prior Publication Data

US 2003/0152771 A1 Aug. 14, 2003

Related U.S. Application Data

(60) Division of application No. 09/534,012, filed on Mar. 24, 2000, now Pat. No. 6,573,032, which is a continuation-in-part of application No. 09/296,176, filed on Apr. 22, 1999, now abandoned.

(51) Int. Cl.⁷ ................................................ B32B 5/16
(52) U.S. Cl. ...................... 428/402; 423/335; 423/339
(58) Field of Search ............................... 428/331, 402; 423/335, 339

(56) References Cited

U.S. PATENT DOCUMENTS

| 3,893,840 | A | | 7/1975 | Wason |
|---|---|---|---|---|
| 3,988,162 | A | | 10/1976 | Wason |
| 4,015,996 | A | | 4/1977 | Wason |
| 4,156,717 | A | | 5/1979 | Wason |
| 4,191,742 | A | | 3/1980 | Wason et al. |
| 4,495,167 | A | | 1/1985 | Nauroth et al. |
| 4,590,052 | A | | 5/1986 | Chevallier et al. |
| 4,708,859 | A | | 11/1987 | Chevallier |
| 4,842,838 | A | | 6/1989 | Chevallier |
| 4,874,594 | A | | 10/1989 | Chevallier |
| 5,123,964 | A | | 6/1992 | Kerner et al. |
| 5,234,673 | A | | 8/1993 | McGill et al. |
| 5,342,598 | A | | 8/1994 | Persello |
| 5,403,570 | A | | 4/1995 | Chevallier et al. |
| 5,419,888 | A | | 5/1995 | McGill et al. |
| 5,635,214 | A | | 6/1997 | Ponchon et al. |
| 5,647,903 | A | | 7/1997 | McGill et al. |
| 5,705,137 | A | | 1/1998 | Goerl et al. |
| 5,906,843 | A | * | 5/1999 | Dew et al. ............... 426/2 |
| 6,573,032 | B1 | * | 6/2003 | Preston et al. ........... 430/335 |

OTHER PUBLICATIONS

Journal of Society of Cosmetics, vol. 29, pp. 497–527 (Aug. 1978).

* cited by examiner

*Primary Examiner*—H. Thi Le
(74) *Attorney, Agent, or Firm*—Carlos Nieves; Raymond Hoch

(57) ABSTRACT

Very high structure, hybrid amorphous silica products (geltates) having very high absorptivity, in which the hybrid silica product has a % carrying capacity DBP value greater than 76.0 and a linseed oil absorption value exceeding 250 cc/100 g, and a production methodology therefor.

7 Claims, No Drawings

VERY HIGH STRUCTURE, HIGHLY ABSORPTIVE HYBRID SILICA AND METHODS FOR MAKING SAME

CROSS-REFERENCE TO RELATED APPLICATIONS

This is a division, of prior application Ser. No. 09/534,012, filed Mar. 24, 2000, now U.S. Pat. No. 6,573,032 which is hereby incorporated herein by reference in its entirety.

This patent application is a continuation-in-part of U.S. pat. appln. Ser. No. 09/296,176, filed Apr. 22, 1999, now abandoned.

BACKGROUND OF THE INVENTION

1. Field of the Invention

The present invention relates to novel silica products and, more particularly, to hybrid precipitated/gel amorphous silica products and similar materials having very high liquid absorption and very high liquid carrying capacities, as well as methods of producing such materials.

2. Description of the Related Art

From a general standpoint, commercially available synthetic silicas can be broadly divided into two basic categories of manufacture, as described in "Cosmetic Properties and Structure of Fine-Particle Synthetic Precipitated Silicas", J. Soc. Cosmet. Chem., 29, 497–521, (August 1978). These categories are those provided from a liquid phase and those from a vapor phase process.

Vapor process silicas, called fumed or pyrogenic silicas, are prepared by hydrolysis of silicon tetrachloride vapor with an oxygen-hydrogen gas at high temperatures to produce silica and gaseous hydrogen chloride by-product. Pyrogenic silicas have high external surface areas and differ from other silicas (e.g., gels, precipitated silicas, and so forth) prepared by the liquid phase process in terms of morphology and other physical parameters.

Liquid phase silicas include amorphous precipitated silicas, silica gels and colloidal silicas produced by acidulating an alkali metal silicate with a mineral or organic acid such as sulfuric acid. In recent years, and to further expand the utility of precipitated silicas, such as for liquid carrier applications, among other things, prior art workers have pursued new techniques for producing precipitated amorphous silicas tailored to have desired properties.

Silica carriers for oils and other liquids are used to deliver precise dosages of absorbed liquid for inclusion in materials such as livestock feed, rubber and plastics. Silica carriers provide a predictable dosage of liquid under conditions where viscosity variations in an uncarried liquid would render dosage control extremely difficult. Further, the particulate form of the silica carrier facilitates transport and storage of the carried liquid.

Ideally, carrier silicas for liquids would possess a combination of desirable characteristics which facilitate handling, loading (liquid onto the carrier) and mixing, including high bulk density, low friability, high oil absorption and carrying capacities, and good flow properties for the combined liquid solid mixture.

A problem associated with conventional silicas having high carrying capacities of various liquids is the friable nature of the silicas, which causes them to break down during manufacturing and customer processing, which results in significant loss of carrying capacity. Therefore, the provision of an efficient method for producing a high structure precipitated/gel silica or hybrid (geltate) carrier for liquid that measurably boosts the liquid (e.g., oil) carrying capacity without sacrificing structural robustness or otherwise undermining the structural strength or integrity of the silica product, would represent a significant improvement over known production methods.

SUMMARY OF THE INVENTION

The present invention relates to a new group of hybrid amorphous silicas that are robust, very high structure materials endowed with a very high liquid carrying capacity and reduced friability. For purposes herein, the terminology "hybrid amorphous silicas" means amorphous silicas having characteristics of both precipitated silicas and silica gels, and this hybrid silica material is also referred to as a "geltate."

These and other advantages are achieved by the provision in the present invention of a hybrid silica or gel-like precipitated amorphous silica product having a percent carrying capacity DBP value equal or greater than 76.0 and a linseed oil absorption value exceeding 250 cc/100 g. According to one embodiment, the inventive silica product of this invention has a % carrying capacity DBP value in the range of 76.0 to 85.0, a linseed oil absorption of about 250 to about 425 cc/100 g, a BET in the range of about 300 to about 675 $m^2/g$, a CTAB specific surface area ranging from about 200 to about 475 $m^2/g$, and a total pore volume (Hg) greater than about 4.5 cc/g.

The present invention also provides methods for producing such a very high liquid carrying capacity hybrid silica in which the silica product is produced by acidulation of an alkali metal silicate under unique reaction protocols.

In one general mode of making the inventive hybrid silica, the method includes the steps, in this sequence, of:

providing an aqueous reaction medium heated to a temperature of from about 30° C. to about 57° C.;

adding simultaneously an acid and alkali metal silicate to the heated aqueous reaction medium at respective rates that maintain the pH of the reaction medium at between 5.0 to 7.0 to form a slurry;

raising the temperature of the reaction medium to about 65° C. to about 95° C.; and separating and recovering precipitated amorphous silica product from the slurry.

Experimental data, such as reported herein, demonstrates the unexpected importance of conducting the step of raising the temperature of the reaction medium to about 65° C. to about 95° C. after performing the prior low temperature/low pH acidulation reaction step involving the co-addition of acid and alkali metal silicate. The filtration characteristics are also enhanced by this protocol including the step of ramping up the temperature of the reaction medium after the initial acidulation reaction step and before conducting further processing.

In one further embodiment of the invention, the inventive method includes the steps, in this sequence, of:

(a) providing an aqueous reaction medium heated to a temperature of from about 30° to about 57° C.;

(b) adding simultaneously an acid and alkali metal silicate to the heated aqueous reaction medium at respective rates that maintain the pH of the reaction medium at between 5.0 to 7.0 to form a slurry;

(c) discontinuing the acid addition while continuing addition of the alkali metal silicate until the pH of the reaction medium becomes 5.5 to 9.5;

(d) raising the temperature of the reaction medium to about 65° C. to about 95° C.;

(e) optionally adding acid to adjust the pH of the slurry to about 5.0 to about 6.5; and (f) separating and recovering precipitated amorphous silica product from the slurry.

Additional experimental studies, reported herein, have shown that even further enhancements in the liquid carrying capacity properties of the very high structure silica product of this invention are achievable by additionally including the above-identified process step (c) in the inventive process scheme. Step (c) forms part of an "aging" procedure where alkali metal silicate alone is added for a time period immediately following the initial acidulation reaction performed in step (b) involving the co-addition of the acid and alkali metal silicate, but before the subsequent heating of the aged reaction medium to about 65° C. to about 95° C. in step (d) to complete the aging procedure.

The hybrid amorphous silica of this invention has numerous and diverse utilities. The inventive silica is implementable as carrier silica, anti-caking silica and free flow silica, among other things. The inventive silica also can be used advantageously as an additive in paper, thixotropes, rubber, paint and coatings.

DETAILED DESCRIPTION OF THE PREFERRED EMBODIMENTS

The present invention provides a new group of hybrid amorphous silicas in the form of a precipitate/gel amorphous materials, which are produced as very high structure materials with enhanced microporosity to provide excellent absorptive power yet without rendering the silica products fragile and friable.

The precipitated amorphous silicas of the present invention are characterized by a % carrying capacity DBP value that is at least 76.0 or greater in value, while maintaining a robust particulate morphology and favorable performance attributes such as a linseed oil absorption exceeding about 250 cc/100 g. The % carrying capacity DBP value range imparted to the silica product of the invention is generally greater than 76.0, preferably is greater than 77.0, and more preferably is in the range of 79.0 to 85.0. The inventive silica product can be more comprehensively characterized as having a % carrying capacity DBP value ranging between 76.0 to 85.0 and a linseed oil absorption ranging between about 250 to about 425 cc/100 g. Other attributes of the inventive particles in this size range are a single point BET specific surface area ranging from about 300 to about 675 $m^2/g$ (more preferably, from about 375 to about 675 $m^2/g$), a total pore volume (Hg) greater than about 4.5 cc/g (more preferably, greater than about 7.0 cc/g), and a CTAB specific surface area ranging from about 200 to about 475 $m^2/g$ (more preferably, about 275 to about 475 $m^2/g$). The unmilled silica product of this invention generally has a particle size of about 20 to about 80 μm; however the particle size can be easily modified by drying (e.g., spray drying), milling and/or other processes to the raw silica product.

These characteristics make the hybrid amorphous silica of the present invention especially well-suited for carrying oils and other liquids.

In manufacturing the products of the present invention, a scheme is followed involving, among other things, an initial acidulation reaction performed in a reaction vessel (equipped with suitable heating equipment, and agitation equipment) into which is charged an aqueous reaction medium (viz., water) heated to a temperature of from about 30° C. to about 57° C. An acid and alkali metal silicate are fed into the vessel simultaneously at respective rates that maintain the pH of the reaction medium at between 5.0 to 7.0, and preferably at a relatively constant pH value (e.g., ±0.2) within this range, to form a slurry. The acid rate can be slightly adjusted to the extent necessary to maintain a constant pH during this process step. In one preferred embodiment, this acidulation step is performed at a pH in the range of 5.0 to 6.5 and at a temperature in the range of about 35 to about 50° C. The duration of this initial acidulation step is dictated largely by practical considerations, such as the capacity of the reaction vessel. The co-addition of the acid and alkali metal silicate generally can be completed within a time period of about 25 to about 80 minutes, and more typically from about 30 to about 60 minutes. The reaction solids content of the reaction mixture at the completion of the co-addition of the acid and alkali metal silicate preferably is less than about 60 g/L, and more preferably about 50 g/L or less. As used herein, the term "alkali metal silicate" includes all the conventional forms of alkali silicates, as for example, metal silicates, disilicates and the like. Water soluble potassium silicates and sodium silicates are particularly advantageous with the latter being preferred. It should be taken into consideration that the mole ratio of the alkali silicate, i.e., the ratio of silicate to alkali metal, contributes, depending on other reaction parameters, to the average pore size of the silica products. In general, acceptable silica products of this invention can be made with silicate mole ratios ($SiO_2/Na_2O$) molar ratios of between about 2.0 to about 3.5.

The alkali silicate solution supplied to the reactor vessel during various processing steps in the inventive method, as described elsewhere herein, generally can contain between about 4 to 15%, and more preferably between about 4.5% and 13%, by weight alkali metal silicate based on the total weight of the alkali metal silicate solution. In order to reduce the alkali silicate concentration of a source solution of alkali silicate to the above-indicated desired range, dilution water can be added to a source solution of alkali silicate before the silicate solution is fed into the reactor, or, alternatively, the dilution water can be combined in situ with the source solution of alkali silicate in the reactor with agitation-mixing to formulate the desired concentration of silicate in the alkali metal silicate solution.

Among other things, the liquid carrying capacities seen in the dried hybrid silica product tend to be inversely related to the silicate concentration in the reaction mixture used in the initial acidulation step. That is, the lower the silicate concentration in the reaction mixture used in the initial acidulation reaction, the higher the liquid carrying capacity tends to be in the dried hybrid silica product. Therefore, in practicing the present invention, one objective is to reduce the silicate concentration as much as practically possible for the initial acidulation reaction. The practical limitation that comes into play here is that more bulk reaction fluid must be handled if the silicate solution is further diluted, which, in turn, will eventually require scaling up of the support and reaction equipment. Other means to mimic or simulate this effect would be equally advantageous.

The acidulating agent that is simultaneously added with the alkali metal silicate to the aqueous reaction medium preheated to 30 to 57° C. can be a Lewis acid or Brönsted acid, and preferably is a strong mineral acid such as sulfuric acid, hydrochloric acid, nitric acid, phosphoric acid, and so forth, and more preferably sulfuric acid, added as a dilute solution thereof.

The strong mineral acid, such as sulfuric acid, is added in conjunction with the alkali metal silicate at respective rates effective to maintain the pH of the reaction batch at between 5.0 and 7.0.

The alkali metal silicate and acid are added or dosed into the reaction batch in a "continuous" manner in the sense that their introduction is never interrupted or otherwise disrupted for more than 15 seconds at a time such that the reaction mixture is not permitted the opportunity to "age", at least not more than nominally, in-between reactant additions during this initial precipitation reaction step. Although non-stop flow introduction of the reactants into reaction mixture is typically practiced in this invention, it nonetheless is conceivable that the reactants alternatively could be intermittently dosed into the reaction mixture every few seconds, instead of being introduced as a non-stop stream. Therefore, the term "continuously" is to be construed broadly enough to cover either of the above-mentioned scenarios for purposes of this invention.

The co-addition of the acid and silicate is terminated when the desired amount of excess silicate has been acidulated, or the holding capacity of the reaction vessel is reached. At that juncture, the reaction mass is a mixture of both primary (ultimate) particles and secondary (aggregate) particles, resulting in a gel-like intermediate.

Then, in an optional further embodiment of the invention, the slurry is aged during which the acid addition is discontinued after the acid/alkali silicate co-addition step while the addition of the alkali metal silicate is continued until the pH of the reaction medium becomes 5.5 to 9.5, and preferably 5.5 to 7.5, before conducting a step of increasing the temperature of the aqueous reaction medium to a value in the range of 65 to 95° C. In general, the alkali silicate is added for this optional "aging" step in a sufficient amount to increase the slurry pH a numerical amount of approximately 0.5 or more with the proviso that the pH increase imparted cannot raise the slurry pH above 9.5. For purposes of this disclosure, the optional step of temporarily adding the alkali metal silicate alone and discontinuing the acid addition after the initial acidulation reaction step (acid/alkali metal silicate co-addition) and the subsequent heating procedure are occasionally characterized as being part of an "aging" of the reaction medium. In any event, once the slurry pH is elevated from the pH at the end of the acid/alkali metal silicate co-addition step to a value in the range of 5.5 to 9.5 where this aging procedure is used, addition of the alkali metal silicate is discontinued and then temperature of the reaction medium is raised significantly.

In this regard, the temperature of reaction medium is generally raised to a temperature of about 65° C. to about 95° C., and preferably ranging from about 90° C. to about 95° C. The temperature increase can be provided using conventional heating equipment used for slurry vessels in the field of endeavor, and the temperature increase rate profile is not particularly limited as long as practical considerations are taken into account to generally ensure that the aqueous reaction medium contents are being substantially uniformly heated up.

After raising the temperature of the reaction medium in this manner, the reaction mixture optionally can be held for a residence time between 0 and 60 minutes, although no holding time is required at this juncture of the process scheme. The duration of any hold time used at the high temperature has been found to be of limited impact upon the desired final product parameters. Therefore, no hold time is required once the slurry is heated to the temperature range of about 65° C. to about 95° C.

In any event, at the conclusion of the heating step and any optional or incidental holding time, the reaction mass includes a mixture of secondary and tertiary particles, but still retains gel and precipitate characteristics.

After completion of the heating step to 65° C. to about 95° C., acid can be added, if necessary, to adjust the pH of the heated slurry downward to a range of about 5.0 to about 6.5. Although not categorically excluded from all modes of practicing this invention, this pH adjustment generally is only desired in the mode of the invention including the intervening aging step of adding alkali metal silicate alone between the acid/alkali metal silicate co-addition step and the heating step (which increases the reaction medium pH). Where the reaction medium is not aged by adding the alkali metal silicate between the acidulation and heating steps, then the pH of the reaction medium at the completion of the heating step (i.e., heating the reaction medium to 65–95° C.) remains substantially the same as that encountered at the conclusion of the prior acidulation reaction step.

The reaction mixture generally is subjected to agitation throughout the processing steps described above. While mild agitation is used during the above process steps, an optional variant of this invention is to employ vigorous or high shear agitation during the precipitation (acidulation) reaction sufficient to cause shearing of the reaction mass into even smaller particulate sizes, if desired.

After the heating step, and any subsequent pH adjustment conducted, the reaction batch is dropped. The reaction mass is filtered, washed, dried, and optionally attrited into smaller particles or formed into granules, pellets or other large (i.e., >100 μm size) particles.

The reaction mass is filtered and washed with water to reduce the $Na_2SO_4$ level to less than 5%, and preferably less than 2%, by weight (e.g., 0.5 to 1.5%). High values of $Na_2SO_4$ tend to reduce the product's carrying capacity and oil absorption values.

Washing of the reaction product is generally conducted after filtering. However, diluting the reaction slurry with water before filtration can aid in reducing the $Na_2SO_4$ levels in subsequent washing procedures. The pH of the washed filter cake can be adjusted, if necessary, prior to proceeding to dry the washed filter cake. The % LOI (2 hr. at 900° C.) generally is 3 to 6% and the % $H_2O$ is 2 to 10% (2 hr. at 105° C.) for the inventive silica.

In one more specific scheme of conducting the inventive process, the following sequence of process steps are included:

an aqueous reaction medium is heated to a temperature of from about 35° C. to about 50° C.;

an acid and alkali metal silicate are added simultaneously to the heated aqueous reaction medium at respective rates that maintain the pH of the reaction medium at between 5.0 to 6.5, and more preferably at approximately 5.6 to 6.0, to form a slurry and for a time period of about 25 to about 40 minutes, and such that the reaction solids at the completion of this step are less than 50 g/L;

the temperature of the reaction medium is then raised to a value ranging from about 65° C. to about 95° C., and more preferably from about 90° C. to about 95° C., and without first conducting any intervening aging step of adding alkali silicate alone (without acid co-addition) to the reaction medium; and then the precipitated amorphous silica product is separated and recovered from the heated slurry, without any intervening process step being required of adjusting the pH of the reaction medium.

In another more specific scheme of conducting the inventive process, the following sequence of process steps are included:

an aqueous reaction medium is heated to a temperature of from about 35° to about 50° C.;

an acid and alkali metal silicate are added simultaneously to the heated aqueous reaction medium at respective rates that maintain the pH of the reaction medium at between 5.0 to 6.5 to form a slurry, and for a time period of about 25 to about 80 minutes, and such that the reaction solids at the completion of this step are less than 50 g/L;

the acid addition is then discontinued while continuing addition of the alkali metal silicate until the pH of the reaction medium becomes 5.5 to 9.5 to age the reaction medium;

the temperature of the aged reaction medium is increased to about 65° C. to about 95° C., and more preferably from about 90° C. to about 95° C.;

the pH of the heated slurry is thereafter optionally adjusted, if desired, to a pH range of 5.0 to 6.5; and then precipitated amorphous silica product is separated and recovered from the slurry.

In any event, after precipitation, filtration, and any washing, the raw silica product obtained can be dried and used as is, or, alternatively, in order to modify the shape and size of the silica product as desired, the recovered silica product can be additionally ground to a desired degree of fineness or converted into larger particles.

Drying can be effected by any conventional equipment used for drying silica, e.g., spray drying, nozzle drying (e.g., tower or fountain), flash drying, rotary wheel drying or oven/fluid bed drying. The dried silica product generally should have a 2 to 10 wt. % moisture level. The nature of the silica reaction product and the drying process both are known to affect the density and liquid carrying capacity. Further, care must be taken that the drying operation and subsequent operations do not detrimentally affect the structure of the silica obtained in the precipitation stage. Rotary wheel spray dried product of this invention generally has an average particle size of 20 to 100+ μm. The dried silica product is in a finely divided form.

To decrease the size of the dried silica particles further, if desired, conventional grinding and milling equipment can be used. A hammer or pendulum mill may be used in one or multiple passes for comminuting and fine grinding can be performed by fluid energy or air-jet mill. Products ground to the desired size may be separated from other sizes by conventional separation techniques, e.g., cyclones, classifiers or vibrating screens of appropriate mesh sizing, and so forth. The ground silica product of this invention generally will have a size about 1–20 μm. The very high structure hybrid silica product of the present invention is generally resistant to attrition. That is, milling or other attrition of the dried product do not reduce the carrying capacity of the silica product, or, if there is a nominal effect, any reduction in carrying capacity is less than 2%.

Although the underlying mechanism is not fully understood yet, it has been discovered that the inventive process results in tangible significant enhancements to the liquid carrying capacity of the hybrid amorphous silica product. While not desiring to be bound to any particular theory at this time, it nonetheless is thought that the inventive processing protocol of maintaining low to moderate solids content (i.e., <60 g/L) at low reactor temperature during the initial acidulation step and subsequently raising the reaction medium temperature to greater than about 65° C., after the initial acidulation step has been performed at a relatively lower pH and temperature, causes numerous fine pores, resulting in a very high structure, very highly absorptive reinforced hybrid silica product (the "geltate"). The further inclusion of an intervening step of adding the alkali silicate alone until the reaction slurry reaches a pH of 5.5 to 9.5 after the initial acid/alkali metal silicate co-addition step and before the heating step is thought to even further enhance the liquid absorption and carrying capacities of the hybrid silica product. Also, the absorptivity is enhanced by the use of the initial low temperature, low pH conditions in the initial acidulation reaction step (acid/alkali-metal silicate co-addition). Additionally, the fact that the present invention conducts the final stage of the acidulation reaction step at a higher temperature also imparts improved filtering characteristics in the hybrid silica (geltate) product.

For purposes of this invention, the measurement of percent carrying capacity of DBP (or "% DBP carrying capacity" for short) is performed by either of the following methods.

Spex Method:

This procedure for measuring "% carrying capacity" of a test liquid, such as for DBP, uses a Spex Mill (Spex Industries, Inc., #8000 Mixer/Mill) which imparts a wrist action non-shear motion to the silica sample being tested. Suitable test jars have a 125 mL capacity are used that can be purchased from VWR Scientific (#IR 120–0125). The test is conducted by simply weighing a sample of silica carrier into the test jar, adding the test liquid, and shaking in the Spex Mill. Carrier weights are measured to 0.01 g accuracy and vary with the carrier being tested. The test jar should be about half full and typical weights are from 5 to 10 grams. Addition of the liquid to the silica powder to be tested is facilitated by making a small hole in the powder, pouring the liquid into it, and covering it with dry powder from the sides. This prevents liquid from sticking to the sides of the jar and the lid while shaking. An equal weight of liquid and carrier are added to the jar and the sample is shaken on the Spex Mill for 30 seconds. This represents 50% carrying capacity as a starting point. If a noticeable amount of liquid adheres to the sides of the jar, it should be scraped off with a spatula prior to adding additional liquid. The sample is observed to confirm that all of the liquid has in fact been taken into the carrier. More liquid is then added to the same jar and the mixture shaken for an additional 30 seconds. This procedure is repeated until one observes a condition where a mixture of dry powder and wet lumps or granules has resulted. Small increments of liquid are added at this point (about 0.3 to 0.5 grams). The mixture will gradually change from powder and lumps to a condition where all of the powder has disappeared. This represents the end point and has the appearance of "modeling clay". The end point is a condition where the carrier has been completely saturated and the resulting product becomes tacky to the touch. At a capacity of 1% less than the end point, the mixture exists as a true powder and will flow while avoiding caking problems encountered with over saturation. The "% Carry Capacity" can then be calculated as follows: (liquid wt. added/(powder wt.+liquid wt.))×100. The test "liquid" is DBP in this disclosure.

Absorptometer E Method (AbE):

This instrumental method for determining "% DBP carrying capacity" utilizes a C. W. Brabender Absorptometer E (Model E-1/1254) and DADS software by HITEC of Luxembourg. A silica sample (about 10.0 g spray dried or 5.0 g milled product) is placed in the mixing chamber. Sample should cover the mixing paddles. Instrument is run at 125 rpm and ambient temperature (about 20–25° C.). DBP of known density is metered into the sample chamber.

The DADS software identifies the peak of maximum torque (100% peak), calculates the amount of DBP added at maximum torque in ml/100 g (DADS uses the inputted sample weight to base calculations on ml DBP/100 g). "% DBP carrying capacity" is calculated from the following equation:

% DBP Carrying Capacity=$g$ DBP/($g$ DBP+100 $g$ product)

where "g DBP"=mL DBP/100 g×DBP density in g/mL.

For purposes of this application, average particle size (APS) is determined using a Microtrac II (Model 7998) Particle Size Analyzer.

Oil absorption, for any of linseed, DBP (dibutylphthalate) oil, or DOP (dioctylphthalate), was determined by the "rub out" method. This method is based on a principle of mixing a oil with a silica by rubbing with a spatula on a smooth surface until a stiff putty-like paste is formed. By measuring the quantity of oil required to have a paste mixture which will curl when spread out, one calculates the oil absorption value of the silica, i.e., the value which represents the volume of oil required per unit weight of silica to saturate the silica absorptive capacity. Calculation of the oil absorption value was done as follows:

oil absorption=100×($cm^3$ oil absorbed/$wt.$ of silica in grams).

The total pore volume (Hg) is measured by mercury porosimetry using a Micromeritics Autopore II 9220 apparatus. The pore diameters can be calculated by the Washburn equation employing a contact angle Theta ($\theta$) equal to 130° and a surface tension gamma equal to 484 dynes/cm. This instrument measures the void volume and pore size distribution of various materials. Mercury is forced into the voids as a function of pressure and the volume of the mercury intruded per gram of sample is calculated at each pressure setting. Total pore volume expressed herein represents the cumulative volume of mercury intruded at pressures from vacuum to 60,000 psi. Increments in volume ($cm^3$/g) at each pressure setting are plotted against the pore radius or diameter corresponding to the pressure setting increments. The peak in the intruded volume versus pore radius or diameter curve corresponds to the mode in the pore size distribution and identifies the most common pore size in the sample.

Specifically, sample size is adjusted to achieve a stem volume of 30–50% in a powder penetrometer with a 5 ml bulb and a stem volume of about 1.1 ml. Samples are evacuated to a pressure of 50 $\mu$m of Hg and held for 5 minutes. Mercury fills the pores from 1.5 to 60,000 psi with a 10 second equilibrium time at each of approximately 150 data collection points.

CTAB external surface area is determined by absorption of CTAB (cetyltrimethylammonium bromide) on the silica surface, the excess separated by centrifugation and determined by titration with sodium lauryl sulfate using a surfactant electrode. The CTAB external surface of the silica is determined from the quantity of CTAB adsorbed (analysis of CTAB before and after adsorption). More specifically, about 0.5 g of silica is placed in a 250-ml beaker with 100.00 ml CTAB solution (5.5 g/l). The solution is mixed on an electric stir plate for 1 hour then centrifuged for 30 minutes at 10,000 rpm. 1 ml of 10% TRITON X-100 is added to 5 ml of the clear supernatant in a 100-ml beaker. The pH is then adjusted to 3.0–3.5 with 0.1 N HCl and titration is done with 0.0100 M sodium lauryl sulfate using a surfactant electrode (viz., a Brinkman SUR1501-DL) to determine the endpoint.

Single-point BET is measured in $m^2$/g by predrying a sample for two hours at 105° C. and then subjected the sample to analysis of surface area by a determination using the BET nitrogen adsorption methods of Brunaur et al., J. Am. Chem. Soc., 60, (1938).

Pour density is determined by weighing 100.0 grams silica product into a 250-mL graduated cylinder and recording the volume occupied. Pour density=sample weight (g)/sample volume (ml).

Loss on ignition (LOI) is the measured sample weight loss at 900° C. for 2 hours (sample previously predried for 2 hr. at 105° C.)

The pH values of the reaction mixtures (5 weight % slurry) encountered in the present invention can be monitored by any conventional pH sensitive electrode.

The hybrid amorphous silica of this invention has numerous and diverse utilities. The inventive silica is implementable as carrier silica, anti-caking silica and free flow silica, among other things. The inventive silica also can be used as an additive in paper, thixotropes, rubber, dentifrice, defoamer, plastics, paint and coatings. For instance, the hybrid silica is useful for such applications as the coating of paper, especially in as a coating material for coated papers where high ink absorption is desired, and in catalysis, and, as noted earlier, as a support for conditioning liquids. For example, a number of liquids may be deposited onto the subject silica support to prepare a conditioned composition, e.g., organic liquids, linseed oil, surface active agents of the anionic type used in detergents such as sulfonates, or of the nonionic type such as alcohols or phenols, and also as vulcanization accelerators and antioxidants for use in the rubber industry. Liquids used as supplements in foodstuffs and feedstuffs can be conditioned using hybrid amorphous silica products of this invention in which the silica is used as a support for liquid active agents such as vitamins. Vitamins that can be conditioned in this manner include, for example, vitamins A, B, C, D, E and K.

The absorption of the liquid onto the hybrid silica support can be carried out in any known manner, for example, by dispersing the liquid onto the silica particulates in a mixer. The amount of liquid absorbed is dependent upon the end-application. The hybrid silica particulates of the invention make it possible to produce conditioned compositions having a liquid content in excess of 50% by weight.

The following non-limiting examples will further illustrate the present invention. All parts, ratios, concentrations, and percentages are based upon weight unless otherwise specified.

EXAMPLES

Example 1 and Comparative Example 1

In these examples, a split batch of very high structure silica was prepared in a 3.78 liter reactor. The raw starting materials used to prepare a hybrid amorphous silica were a 13.3% by weight sodium silicate solution having a $SiO_2/Na_2O$ molar ratio of 2.65, and dilute (11.4 wt. %) sulfuric acid. The batch procedure involved adding 1200 ml of water to the reactor and the aqueous medium was heated to 40° C. Silicate at 29.4 ml/min and acid at 15.9 ml/min were added simultaneously with the pH of the aqueous reaction medium maintained at a constant pH value 5.8. The co-addition of the acid and silicate was continued for 30 minutes. At this point 1000 ml of reactor slurry was removed from the reactor, filtered and washed with 1000 ml hot water followed by 500 ml methanol. Total filtration and washing time was 6 hours. The resultant wetcake product was dried for 8 hours in a forced air oven set at 90° C. and subsequently milled in a laboratory mill. This dried, milled product is Comparative Example 1. The remaining reactor contents were then heated to 94° C., which took 22 minutes. Reactor slurry pH was 6.3. 1000 ml of the reaction mass was then filtered and washed with 1000 ml water followed by 500 ml methanol. Total filtration and washing time was 12 minutes. The resultant wetcake product was dried for 8 hours in a forced air oven set at 90° C. and subsequently milled in a laboratory mill. This dried, milled product is Example 1.

The dried silica product displayed the characteristics summarized in Table 1 below.

TABLE 1

| Example | BET | CTAB | Tot. Pore Abs. | Oil Vol. | % DBP Car. Cap. | Filtration Time |
|---|---|---|---|---|---|---|
| Comp. Ex. 1 | 658 | 300 | 3.87 | 194 | 72 | 6 hr. |
| 1 | 451 | 301 | 7.33 | 259 | 79.8 | 12 min. |

The effect of heat aging is clearly shown by the significant increase in silica product oil absorption, DBP carrying capacity and total pore volume. Also, the filtration rate dramatically improved by being reduced from 6 hours to 12 minutes.

Examples 2–9

In these examples, separate batches of very high structure silica were prepared in a 3.78 liter reactor at various reaction and aging conditions. The raw starting materials used to prepare a hybrid amorphous silica were a 13.3% by weight sodium silicate solution having a $SiO_2/Na_2O$ molar ratio of 2.65, and dilute (11.4 wt. %) sulfuric acid. The batch procedure involved adding 1.1–1.5 liters of water to the reactor and the aqueous medium was heated to the reaction temperature. Silicate at 12–24 ml/min and acid at 6–12 ml/min were added simultaneously with the pH of the aqueous reaction medium maintained at a constant pH value of 5.0 to 7.0 (±0.2). The co-addition of the acid and silicate was continued for 30–60 minutes. Afterwards, the acid feed was stopped and the silicate continued until the reaction pH reached an increased pH value. The reactor contents were then heated to 94° C. The acid was then restarted at 6–12 ml/min and continued until a 5.5 pH was reached. The aqueous reaction medium was mildly agitated in a continuous manner during this process. About half of the reaction mass was then filtered and washed with 1.5 liter hot water followed by 500 ml methanol. The filter cake was oven dried overnight at 105° C. and thereafter milled in a laboratory mill (Varco, Inc.).

The dried silica product displayed the characteristics summarized in Table 2 below for the various reaction conditions indicated.

TABLE 2

| Ex. | Init. water vol. | Rxn pH | Rxn temp (° C.) | Rxn sol g/L | Co-add. time | Age pH | Age temp (° C.) | BET | CTAB | Tot. Pore Vol. | Oil Abs. | % DBP Car. Cap. |
|---|---|---|---|---|---|---|---|---|---|---|---|---|
| 2 | 1.5 | 6 | 40 | 33.6 | 60 | 6.5 | 94 | 337 | 245 | 10.8 | 343 | 82.9** |
| 3 | 1.5 | 6 | 40 | 33.6 | 60 | 7 | 94 | 405 | 260 | 10.8 | 345 | 83.2** |
| 4 | 1.5 | 5.5 | 40 | 33.6 | 60 | 6.5 | 94 | 400 | 290 | 10.5 | 361 | 84.6** |
| 5 | 1.5 | 5.5 | 40 | 33.6 | 60 | 6 | 94 | 397 | 291 | 8.9 | 347 | 82.6** |
| 6 | 1.5 | 5.5 | 40 | 33.6 | 60 | 6 | 94 | 500 | 350 | 7.76 | 380 | 83.8** |

TABLE 2-continued

| Ex. | Init. water vol. | Rxn pH | Rxn temp (° C.) | Rxn sol g/L | Co-add. time | Age pH | Age temp (° C.) | BET | CTAB | Tot. Pore Vol. | Oil Abs. | % DBP Car. Cap. |
|---|---|---|---|---|---|---|---|---|---|---|---|---|
| 7 | 1.5 | 5.5 | 40 | 33.6 | 60 | 6.5 | 94 | 560 | 352 | 7.9 | 385 | 84.4** |
| 8 | 1.1 | 5.5 | 40 | 45.6 | 30 | 6.5 | 94 | 581 | 297 | 7.5 | 340 | 81** |
| 9 | 1.1 | 5.5 | 40 | 45.6 | 30 | 6 | 94 | 633 | 425 | 7.31 | 350 | 83.4** |

Table Glossary:
Initial water
volume: in liters
Rxn pH: the acidulation reaction pH
Rxn temp: the reaction temperature
Rxn sol: final reaction solids in g/L, on a dry basis (105° C. overnight)
Co-add. Time Co-addition time of silicate and acid in minutes
Age pH: pH during the aging procedure
Age temperature: the aging temperature
BET in $m^2/g$
CTAB: in $m^2/g$
Tot. Pore: total pore volume in ml/g
Oil Abs.: linseed oil absorption (cc/100 g)
DPB Car. Cap: % DPB carrying capacity
*: measured by Spex method
**: measured by AbE method Examples 10–18 and Comparative Examples 2–4

In these examples, separate batches of very high structure silica were prepared in a 1500 liter reactor at various reaction and aging conditions. The raw starting materials used to prepare a hybrid amorphous silica were a 13.3% by weight sodium silicate solution having a $SiO_2/Na_2O$ molar ratio of 2.65, and dilute (11.4 wt. %) sulfuric acid. The batch procedure involved adding 500 liters of water to the reactor and the aqueous medium was heated to the reaction temperature. Silicate at 4.1 L/min and acid at 2.18 L/min were added simultaneously with the pH of the aqueous reaction medium maintained at a constant pH value (±0.2). The co-addition of the acid and silicate was continued for 60 minutes. After 60 minutes, the acid feed was stopped and the silicate continued until the reaction pH reached an increased pH value. The reactor contents were then heated to an aging temperature (about 0.5 to 1.5° C./min) and held for an aging time of 0–60 minutes. The acid was then restarted at 2.18 L/min and continued until the pH reached 5.5 and the reaction mass was digested for 10 minutes. The aqueous reaction medium was mildly agitated in a continuous manner during this process. The reaction mass was then filtered and washed to 1000 μmhos conductivity. The filter cake was spray dried at 5–25% solids to 3–5% moisture content.

The dried silica product displayed the characteristics summarized in Table 3 below for the various reaction conditions indicated.

TABLE 3

| Ex. | Rxn pH | Rxn temp (° C.) | Rxn sol g/L | Age pH | Age temp (° C.) | Age time | BET | CTAB | Tot. Pore vol. | Oil Abs. | % DBP Car. Cap. |
|---|---|---|---|---|---|---|---|---|---|---|---|
| Comp. Ex. 2 | 8 | 40 | 32.5 | 9.5 | 90 | 0 | 323 | 237 | 3.8 | 237 | 73* |
| Comp. Ex. 3 | 8 | 40 | 32.5 | 8.0 | 90 | 60 | 297 | 224 | 4.1 | 224 | 72* |
| Comp. Ex. 4 | 6 | 60 | 32.5 | 9.5 | 70 | 0 | 275 | 239 | 4.8 | 239 | 73.5 |
| 10 | 5.8 | 40 | 32.5 | 7.3 | 90 | 0 | 383 | 266 | 5.9 | 320 | 79.2** |
| 11 | 5.5 | 35 | 30.0 | 7.25 | 90 | 0 | 455 | 328 | 4.93 | 279 | 76.7** |
| 12 | 5.5 | 35 | 54.0 | 8.75 | 70 | 0 | 492 | 328 | 5.45 | 282 | 76.2** |
| 13 | 6.2 | 45 | 44.0 | 8.00 | 80 | 0 | 469 | 276 | 5.7 | 299 | 76.4** |
| 14 | 7 | 35 | 30.0 | 8.75 | 90 | 0 | 429 | 281 | 6.05 | 311 | 78.4** |
| 15 | 5.5 | 55 | 30.0 | 8.75 | 70 | 0 | 483 | 270 | 5.50 | 280 | 78.1** |
| 16 | 5.8 | 40 | 32.5 | 8.0 | 90 | 0 | 366 | 240 | 6.4 | 302 | 77.4** |
| 17 | 6.0 | 40 | 32.5 | 8.0 | 90 | 0 | 318 | 235 | 5.9 | 305 | 77.4* |
| 18 | 6.0 | 40 | 32.5 | 9.5 | 70 | 60 | 366 | 240 | 6.4 | 302 | 78.4** |

The definitions of the column headings in Table 3 are the same as those defined above in the table glossary described for Table 2.

As can be seen from the above Examples 1–18 and Comparative runs, it is a combination of variables which yields the inventive hybrid silica having a DBP carrying capacity of greater than 76. In this regard, the data shows that the aging temperature of between about 65 and 95° C. is a critical parameter of the process. The additional importance of other reaction variables to product % DBP carrying capacity are illustrated in Comparative Examples 2, 3, and 4 in Table 3. Namely, a DBP carrying capacity of greater than 76% is not achieved when the acidulation reaction pH is greater than about 7.0 (Comparative Examples 2 and 3), or where the acidulation reaction temperature is greater than 57° C. (Comparative Example 4).

Example 19 and Comparative Examples 5–6

The % DBP carrying capacity of a hybrid silica product designated Example 19, which was made in the same manner as Example 16 above, was compared to that of several commercial precipitated silica products marketed for liquid carrying applications. To provide this comparison, the % DBP carrying capacity was measured for a commercial silica product ZEOFREE® 181, available from J. M. Huber Corporation, Havre de Grace, Md., as Comparative Example 5 ("Comp. Ex. 5"), and another commercial silica product SIPERNAT® 50, manufactured by Degussa AG, Frankfurt am Main, Germany, as Comparative Example 6 ("Comp. Ex. 6"). The results are reported in Table 4 below.

TABLE 4

| Property | Example 19 | Comp. Ex. 5 | Comp. Ex. 6[a] |
|---|---|---|---|
| % $H_2O$ | 5.5 | 4.5 | 5.3 |
| % LOI | 4.5 | 4.0 | 4.4 |
| Pour Density, g/ml | 0.13 | 0.16 | 0.15 |
| % $Na_2SO_4$ | 0.5 | 1.0 | 0.4 |
| APS, μm | 37.0 | 55.0 | 36.5 |
| CTAB, m²/g | 240 | 151 | 297 |
| BET, m²/g | 366 | 185 | 377 |
| Linseed Oil Absorb., ml/100 g | 302 | 250 | 272 |
| % DBP Carrying Capacity* | 77.4 | 75.5 | 75.0 |
| Tot. Pore Vol. (Hg), cc/g | 6.4 | 4.9 | 4.6 |

[a]Comp. Ex. 6 results are an average of 4 test samples
*% DBP carrying capacity measured by Spex method According to the test results, the % DBP carrying capacity of the unmilled inventive silica product of Example 19 was superior to both the ZEOFREE® 181 and SIPERNAT® 50. Moreover, the inventive silica product was robust and non-friable as it did not break down upon manufacturing and post-production processing.

Also, to investigate the sensitivity of the absorbtivity properties of the inventive silica to attrition, a sample of the silica of Example 19 was hammermilled. Upon hammermilling, the % DBP carrying capacity remained at 77.4%, which indicated that the very high structure inventive silica product was not sensitive to attrition.

While the invention has been described in terms of its preferred embodiments, those skilled in the art will recognize that the invention can be practiced with modification within the spirit and scope of the appended claims.

What is claimed is:

1. A composition of matter comprising finely divided silica having a % carrying capacity DBP value of greater than 76.0 and a linseed oil absorption value exceeding 250 cc/100 g.

2. A composition according to claim 1, wherein the % carrying capacity DBP value is in the range of 76.1 to 85.0.

3. A composition according to claim 1, wherein the % carrying capacity DBP value is greater than 77.0.

4. A composition according to claim 1, wherein the finely divided silica has an unmilled median particle size of about 30 to about 100 μm.

5. A composition according to claim 1, wherein the finely divided silica has an unmilled median particle size of about 80 to about 250 μm.

6. A composition according to claim 1, wherein a total pore volume (Hg) greater than about 4.5 cc/g.

7. A composition of matter comprising finely divided silica having a % carrying capacity DBP value in the range of 76.0 to 85.0, a linseed oil absorption of about 250 to about 425 cc/100 g, a single point BET specific surface area ranging from about 300 to about 675 m²/g, a total pore volume (Hg) greater than about 4.5 cc/g, and a CTAB specific surface area ranging from about 200 to about 475 m²/g.

* * * * *